United States Patent [19]
Gleicher et al.

[11] Patent Number: 5,218,431
[45] Date of Patent: Jun. 8, 1993

[54] RASTER IMAGE LOSSLESS COMPRESSION AND DECOMPRESSION WITH DYNAMIC COLOR LOOKUP AND TWO DIMENSIONAL AREA ENCODING

[75] Inventors: Michael K. Gleicher, Albuquerque; Robert W. Conley, Tijeras, both of N. Mex.

[73] Assignee: The United States of America as represented by the Secretary of the Air Force, Washington, D.C.

[21] Appl. No.: 514,985
[22] Filed: Apr. 26, 1990
[51] Int. Cl.$^5$ .................................. H04N 11/04
[52] U.S. Cl. .......................... 358/13; 340/703; 358/136; 358/133
[58] Field of Search ............... 358/136, 903, 133, 135, 358/13, 21 R; 340/703

[56] References Cited

U.S. PATENT DOCUMENTS

| | | | |
|---|---|---|---|
| 3,987,412 | 10/1976 | Morrin, II | 340/146.3 |
| 4,070,694 | 1/1978 | Sakamoto et al. | 358/133 |
| 4,302,775 | 11/1981 | Widergren et al. | 358/136 |
| 4,369,463 | 1/1983 | Anastassiou et al. | 358/135 |
| 4,580,134 | 4/1986 | Campbell et al. | 340/703 |
| 4,654,484 | 3/1987 | Reiffel et al. | 358/133 |
| 4,717,956 | 1/1988 | Moorhead et al. | 358/135 |
| 4,725,885 | 2/1988 | Gonzales et al. | 358/135 |
| 4,807,029 | 2/1989 | Tanaka | 358/133 |
| 4,816,914 | 3/1989 | Ericson | 358/133 |
| 4,847,677 | 7/1989 | Music et al. | 358/13 |
| 4,857,991 | 8/1989 | Music et al. | 358/13 |
| 4,969,042 | 11/1990 | Houtman et al. | 358/903 X |

OTHER PUBLICATIONS

"Frame Replenishment Coding of Television"; Haskell; *Advances in Electronics & Electron Physics, Suppl. #12;* 1979; pp. 189–217.
Binary Image Compression-Ronald B. Arps-Dept. of Elect. Eng. pp. 219–275-Linkoping Univ; 1979.
Transform Image Coding-Andrew G. Tescher; pp. 113–217 Engin. Science Operations-Aerospace Corp; 1979.
A Universal Data Compression System-Jorma Rissanen 1983-IEEE, vol. IT-29.
A Technique for High-Performance Data Compression, Terry A. Welch, Spurry Research Center.
Data Compression of Digital Color Pictures, Goran Einarsson & Goran Roth-Telecommunication Theory.
A Method for Constr. of Minimum-Redundancy Codes-David A. Huffman-Sep.
Generating Huffman Codes-System Design-George Grosskopf, Jun., 1983-Computer Design pp. 137–140.
Quadtree: A Fortran Program to Extract the Quadtree Structure of a Raster Format Multicolored Image P. A. Walker and I. W. Grant-CSIRO Div. of Water and Land Resource (Sep. 5, 1985). pp. 401–409.

*Primary Examiner*—Victor R. Kostak
*Attorney, Agent, or Firm*—Bernard E. Franz; Donald J. Singer

[57] ABSTRACT

A computer program is used to compress color graphics animation sequences for local storage and transmission to remotely networked sites in a significantly reduced size It allows playback of these animations on a wide variety of workstations ranging from personal computer class machines to high end scientific and engineering workstations such as Sun and Silicon Graphics machines. The basic raster image to be compressed is full color with 24-bits per pixel. The compressed form of a raster image is such that the original image can be reconstructed exactly, with no loss of information, on the same computer that compressed it (typically a large mainframe supercomputer) or on the smaller scientific or engineering workstation. A precompression conversion to palette form of a full color image is possible if the computer on which the reconstruction and display is to take place has limited color capabilities; this is the case for lower cost personal computers and workstations. The time required to compress, and the size of the compressed form, are allowed to be data dependent in order to achieve 100 percent lossless compression. The algorithm is specially designed for raster animations, in such a way that a reasonable frame rate (number of frames per second during decompression) can be achieved across a wide range of personal computers, workstations and mainframes; typical frames rates are 5 to 30 frames per second on conventional workstations. A compression ratio achieved is nominally 100:1 for computer generated animations of 3-dimensional scenes or data visualization.

7 Claims, 9 Drawing Sheets

Microfiche Appendix Included
(1 Microfiche, 151 Pages)

| C | o | m | p | r | x | x | x |
|---|---|---|---|---|---|---|---|
| t | t | t | t | t | t | t | t |

| ... |
|-----|
|     |

| d | d | / | m | m | / | y | y |
|---|---|---|---|---|---|---|---|
| h | h | : | m | m | : | s | s |
| f | - | - | - | - | - | - | - |

| first frame # | # of frames |
|---------------|-------------|

*Fig. 5*

| f | - | - | - | # of words | | | |
|---|---|---|---|---|---|---|---|
| x | | y | | w | | h | |
| - | - | - | - | - | - | - | - |
| <Data> | | | | | | | |
| <Data> | | | | | | | |
| ... | | | | | | | |
| <Data> | | | | | | | |

*Fig. 6*

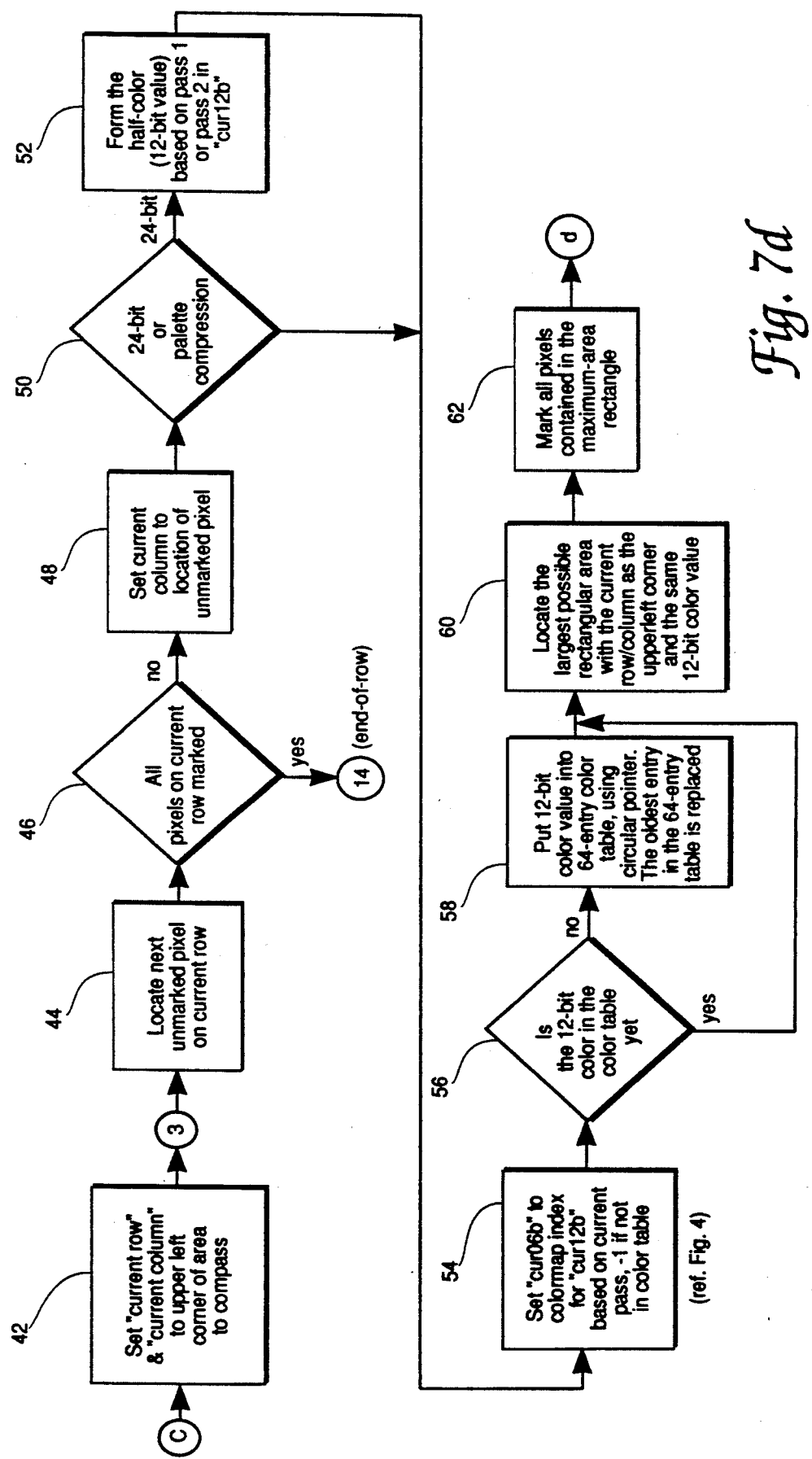

RASTER IMAGE LOSSLESS COMPRESSION AND DECOMPRESSION WITH DYNAMIC COLOR LOOKUP AND TWO DIMENSIONAL AREA ENCODING

RIGHTS OF THE GOVERNMENT

The invention described herein may be manufactured and used by or for the Government of the United States for all governmental purposes without the payment of any royalty.

MICROFICHE APPENDIX

A microfiche appendix comprising one microfiche of 151 frames is a part of this application.

BACKGROUND OF THE INVENTION

The present invention relates generally to raster image compression and decompression.

Image compression is not a new technique. Many different schemes have existed for many years, and include such techniques as run length encoding, Huffman style variable bit length encodings, and mathematical transformation methods. Each of these achieves a varying degree of compression ratio (i.e., the ratio of the original image size to the compressed image size). Some, especially the mathematical transformation methods, cause loss of data to some degree: the compressed image cannot be decompressed to yield an exact, bit-for-bit copy of the original image.

1. Run Length Encoding. This method makes one pass through a data file, looking for repeated pixel values (i.e., colors). Repeated sequences are represented in the output file using a descriptor which contains the "value" and a "count" of the number of times the value is repeated sequentially at that point within the image. A limitation of this technique is that it does not work well on raster graphics animations unless the images are fairly simplistic.

2. Huffman Encoding. This method uses the well-known Huffman algorithm, which makes two passes over the data file. The first pass is used to generate a population count of individual bytes within an image. The second pass replaces each byte with a token whose size in bits is based upon the population counts determined in the first pass. Typically, the most populous byte is replaced with a single bit in the output file, the tokens used for succeedingly less populous bytes are based upon an algorithm which requires that the encoding for a particular value be unique such that no token can be a subset of another token. Limitations of this technique include: a) this algorithm is primarily useful for text files; it typically compresses raster image files by a factor of 2:1; b) the algorithm is slow, requiring two passes through the data; and c) the algorithm is inherently limited to a maximum compression of 8:1.

Typical compression ratios are in the 10:1 range for best case images using any of the common techniques. Huffman encodings have the additional disadvantage of requiring time consuming bit shifts and masks at the 1-bit level on both compression and decompression. This makes them less suitable for speedy processing.

None of these techniques typically exploit the particular characteristics of animated sequences. Nor do they to any great degree exploit modern computer architectures for vector or parallel processing. Thus there is a major need in the field for a modern algorithm which is lossless, tailored for high spatial and color resolution images, specifically designed to exploit the properties of raster animations, and which targets modern generations of supercomputers and workstations.

United States patents of interest include Tanaka U.S. Pat. No. 4,807,029, which describes a 2D mathematical transformation technique, followed by encoding for image compression. The precompression 2D transformation is a Hadamard orthogonal transformation applied to sub-image blocks of $M \times N$ pixels, which produces $M \times N$ blocks of transformed values. The compression encoding of the images uses an $M \times N$ bit allocation table which specifies the number of bits to retain for each of the $M \times N$ transformed values; this table allocates zero bits for block cells farther than an arbitrary threshold R from the zero frequency term (1,1) (that is, for cells (m,n) where $[(m-1)^2+(n-1)^2]^{\frac{1}{2}} > R$). The transformation step and bit allocation both introduce loss of information, preventing the exact reconstruction of the original image. This is the case for the general class of mathematical transformations applied to image compression.

Patent numbers Music et al U.S. Pat. Nos. 4,847,677 and 4,857,991 describe compression using run length encoding; line-to-line and frame-to-frame coherence are employed to reduce image size. RGB color values of an image are converted to color lookup table (palette) form as part of the compression using a popularity algorithm which selects the most frequently occurring colors (and rejects the least frequently occurring colors). Palette selection can cause loss of color information; since it is an integral part of compression, the compression is lossy.

These patents primarily describe an invention for transmission of video signals rather than computer generated images; speed of encoding, transmission, and decoding are therefore paramount. Loss of data is allowed. The run length encoding is strictly one dimensional, in keeping with the nature of a video signal. Additional signal processing, for example, the calculation and encoding of luminance information, is used to reduce the effects of noise. Calculation of the color lookup table and of luminance includes arbitrary thresholds which can be fixed or allowed to vary adaptively. Values which differ by an amount greater than the threshold are considered distinct; otherwise, the values are considered to be the same. All of these techniques are mechanisms to identify and reject image components subjectively considered insignificant to overall image quality: they do not provide for the exact reproduction of the original images.

Patent number Ericsson U.S. Pat. No. 4,816,914 describes a block transform encoding of images, together with motion detection to permit frame-to-frame coherence to reduce the size of the encoded image sequence, The block transform computes discrete cosine transform coefficients for sub-image blocks of pixels; the coefficients are discretized to reduce the number of bits of precision, and subjected to a threshold value to reject coefficients of sufficiently small value. Each of these steps introduces loss of information. The quantization step is actively adjusted by means of motion prediction prior to encoding the frame. The encoding is performed with a quad-tree technique to select those coefficient values to represent the image.

Patent numbers Gonzales et al U.S. Pat. No. 4,725,885 and Anastassiou et al U.S. Pat. No. 4,369,463 describe a grayscale quantizer and entropy encoder for monochromatic images, using differential pulse code modulation techniques. The quantizer maps the full range of grayscale values to fewer values by dividing the full range into subsets of consecutive values, each subset being represented by a single quantized number. For example, if the grayscale range is 0 to 255, then a subset could be the range 1 to 17, represented by a quantized value of 12. The quantization causes loss of information by causing originally distinct pixel values to be represented by a single quantized value, preventing the reconstruction of the original values. Eliminating the quantization loss requires bypassing the quantization step, resulting in a significant reduction in the degree to which an image is compressed.

The quantized pixels are encoded using a Huffman style encoder, in which a varying number of bits is used to represent the quantized values. Information about the neighboring pixels is used to determine the surrounding context in which the pixel occurs, and to determine the extent to which the pixel value deviates from the surrounding context in both sign and magnitude. The quantization step is adaptive based on the surrounding context. The use surrounding context is not the same as applying line-to-line coherence; frame-to-frame information is not used. These techniques are designed for the transmission of video signals, where loss of information is acceptable.

Patent number Moorhead et al U.S. Pat. No. 4,717,956 describes an image compression technique using motion compensation apparatus. Motion compensation involves predicting the displacement of an object point of a video scene, predicting the intensity value at the current pixel, and calculating the intensity difference to correct the initial displacement estimate. Information from neighboring pixels of one image, and from previous images, are used in the prediction step. More specific details about the encoding format for the output bit stream and the expected compression ratio are not given.

Patent number Campbell et al U.S. Pat. No. 4,580,134 describes an apparatus for generation of images within video games and other such devices. It specifically targets the circuitry in which an image is generated and stored, and the circuitry by which the video signal to drive a monitor is derived. This patent does not directly apply to the compression and encoding of images of arbitrary external sources.

Patent number Windergren et al U.S. Pat. No. 4,302,775 describes a block transform method for compression of digital images with adaptive control over the normalization of the number of retained bits of the transformation coefficients which represent the image. This technique addresses television signals, and a video broadcast system is described. The transform which has been chosen is the discrete cosine transformation in which the constant term coefficient is always transmitted with a fixed number of bits, and for which the low order coefficients are Huffman encoded with a predetermined Huffman table and long strings of zeros of the high order coefficients are run length encoded. The apparatus targets real time NTSC video frame rates for compression and decompression. The techniques of this patent are lossy, as is the case for general mathematical transform techniques.

Patent numbers Sakamoto et al U.S. Pat. No. 4,070,694 and Morrin, II U.S. Pat. No. 3,987,412 describe compression apparatus for compressing and transmitting 1 bit per pixel scanned images such as facsimile transmissions. Each pixel is represented by either 0 (black) or 1 (white). The algorithms and apparatus do not directly apply to grayscale or color images in which complexity increases exponentially over images at 1 bit per pixel.

In summary, the patents reviewed above all use one or more of the techniques of one dimensional run length encoding, Huffman encoding, discrete cosine transformations, and variable precision numeric representation.

The following papers are representative of the state of the art:

Huffman, David A.; "A Method for the Construction of Minimum-Redundancy Codes", Proceedings of the I.R.E., pages 1098-1101, September 1952.

Grosskipf Jr, George; "Generating Huffman Codes", Computer Design, pages 137-140, 1983.

Arps, Ronald A.; "Binary Image Compression, Advances in Electronics and Electron Physics", Supp. 12, pages 219-275 (Academic Press, Inc., 1979).

Haskell, Barry G.; "Frame Replenishment Coding of Television", Advances in Electronics and Electron Physics, Supp 12, pages 189-217 (Academic Press, Inc., 1979).

Tescher, Andrew G.; "Transform Image Coding", Advances in Electronics and Electron Physics, Supp. 12, pages 113-155 (Academic Press, Inc., 1979).

Welch, Terry A.; "A Technique for High-Performance Data Compression", Computer, pages 8-19, (IEEE, 1984)

Rissanen, Jorma; "A Universal Data Compression System, IEEE Transactions on Information Theory", Vol. IT-29, No. 5, pages 656-664, September 1983.

Einarsson, Goran and Roth, Goran; "Data Compression of Digital Color Pictures", Computer & Graphics, Vol. 11, No. 4, pages 409-426, 1987.

Walker, P. A. and Grant, I. W.; "Quadtree: A Fortran Program to Extract the Quadtree Structure of a Raster Format Multicolored Image", Computers U Geosciences, Vol. 12, No. 4A, pages 401-410, 1986.

SUMMARY OF THE INVENTION

An objective of the invention is provide a computer program to compress color graphics animation sequences for local storage and transmission to remotely networked sites in a significantly reduced size.

Another objective is to allow playback of these animations on a wide variety of workstations ranging from Personal computer class machines to high end scientific and engineering work stations such as Sun and Silicon Graphics machines.

The basic raster image to be compressed is full color with 24-bits per pixel. The compressed form of a raster image is such that the original image can be reconstructed exactly, with no loss of information, on the same computer that compressed it (typically a large mainframe supercomputer) or on the smaller scientific or engineering workstation. A precompression conversion to palette form of a full color image is possible if the computer on which the reconstruction and display is to take place has limited color capabilities; this is the case for lower cost personal computers and workstations.

Advantages and New Features

The algorithm uses elemental operations which are easy to build directly into hardware for fastest operation. We have specifically designed this algorithm to be supportable in Very Large Scale Integrated-Circuit hardware.

The time required to compress, and the size of the compressed form, are allowed to be data dependent in order to achieve 100 percent lossless compression. Our algorithm is specially designed for raster animations, in such a way that a reasonable frame rate (number of frames per second during decompression) can be achieved across a wide range of personal computers, workstations and mainframes; typical frames rates are 5 to 30 frames per second on conventional workstations. We exploit ne techniques t achieve a compression ratio which is nominally 100:1 for computer generated animations of 3-dimensional scenes or data visualization. Best case results are in the 1000:1 range. We explicitly target modern computer architectures for improved performance in speed of compression and decompression.

New features and advantages are the following:

1. Lossless compression. Compressed images can be decompressed to yield exactly the original image which was compressed.

2. Two dimensional representation. This algorithm represents rectangular areas" of an image as single units. In this way larger numbers of pixels can be represented by a single descriptor, which dramatically reduces the storage space for the compressed form of the image.

3. Frame coherence. Only pixel values which differ from frame-to-frame are described.

4. Multi-pass, with processing of high order bits separate from processing of low order bits. Since most computer generated images have smoothly changing color or brightness values, the high order bits change far less frequently than the low order bits. Consequently the high order bits compress to a significantly smaller size than the low order bits. (Compressing with all bits being considered would have compression ratio bounded by the worst case of these two passes, which would result in a large size of compressed image.)

5. Dynamic color lookup tables. This technique exploits spatial locality of color in a new way, which is specifically suited for hardware implementation. This allows colors to be represented as 6-bit values rather than 12-bit values, resulting in a smaller number of bits used for the descriptors. In 24-bit mode, a separate color table is created and maintained (from frame-to-frame for difference images) for each 12-bit pass.

6. Byte-sized descriptors. To enable easier playback on workstations and personal computers with a minimum of shifting and masking, all descriptors are a multiple of eight bits (1 byte) in length.

7. Palette generation: A variable-sized palette can be generated from the 24-bit images for playback on machines such as Personal computers or workstations with less color capability.

8. Palette coherency. For "palette" compressions, only palette entries which change from frame-to-frame are described.

Salient features of the invention (two dimensional area encoding, dynamic color lookup tables, upper and lower half colors compressed separately in two passes) do not appear anywhere in the prior art listed above. Other features of the invention (such as frame-to-frame coherence for compression of animations) is represented, but only in a very few of the patents, and then not identical to its use herein

BRIEF DESCRIPTION OF THE DRAWING

FIG. 5 is a diagram showing a file header;

FIG. 6 is a diagram showing frame structure; and

DETAILED DESCRIPTION

Figure 1:
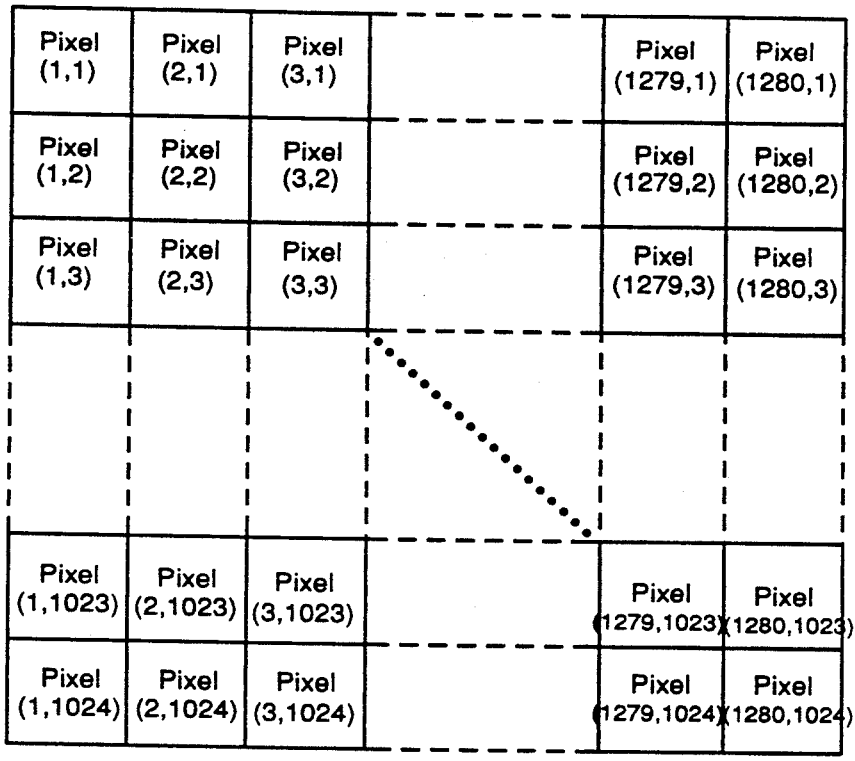
FIG. 1 is a diagram showing organization of an input raster image pixel array.

System for Color Image Compression and Decompression

FIG. 8 is a block diagram of a system for compression, decompression and display of color images. Block 810 represents a graphics file of an original color raster image. The file is supplied to a data processor 820, which for example may by a main frame supercomputer or a workstation. The processor 820 provides apparatus for performing the compression algorithm shown in the flow chart of FIGS. 7a–7f. The processor 820 operates with a memory 822, part of which is used for one or two color maps 824, and one or two color inverse maps 826. The output from the processor 820 is a file of compressed image data 830. This file may be stored locally for later use; or it may be transmitted to another location via a transmitter 840, a transmission line 845, and a receiver 850 to a file 860. For decompression, the data from file 860 (or from file 830) is supplied to a data processor 870, which may for example be a workstation or a personal computer. The processor 870 operates with a memory 872, part of which is used for one or two color maps 874 and one or two color inverse maps 876. The output from the processor may be supplied to a display 880.

Raster Image Definitions

A picture element, or pixel, is the smallest elemental point for a digital raster image. The compression algorithm operates on a two dimensional array of integers which comprise a raster image; each integer represents the color and brightness information for one pixel.

Pixels are arranged in horizontal lines, called raster lines; and the raster lines are arranged vertically to form a complete image.

Pixel positions within a raster line are numbered from the left, which is pixel 1; and raster lines are numbered from the top, which is raster line 1. Each pixel position of an image is specified by two numbers (x,y). specifies the position of the pixel within the raster line, and y specifies the line. The input data for the compression algorithm is a two dimensional array of pixels together with W, the number of pixels in a raster line; and h, the number of lines. FIG. 1 illustrates the pixel position numbering of a raster image.

Each pixel of a full color image has 24 binary bits of color information. This number is further divided into three 8-bit numbers which represent the amount of red, green, and blue primary colors. (Each primary color number can range from 0 to 255.)

Figure 2A:
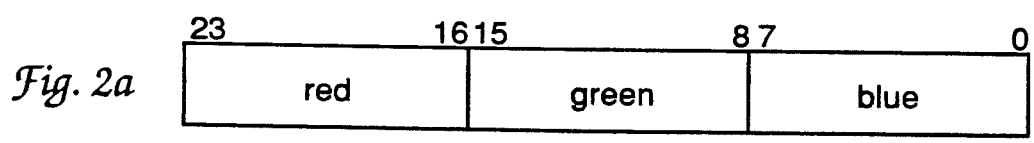
FIG. 2a–2c comprise diagrams showing organization of a 24-bit full color pixel value for 2-pass compression, with FIG. 2(a) showing three 8-bit primary color values, FIG. 2(b) showing 24 individual bits of a full color pixel value, and FIG. 2(c) showing at (c1) the organization of 12 bits used for Pass 1 of a 2-pass compression and at (2c) the organization of 12 bits used for Pass 2 of a 2-pass compression.
Figure 2B:
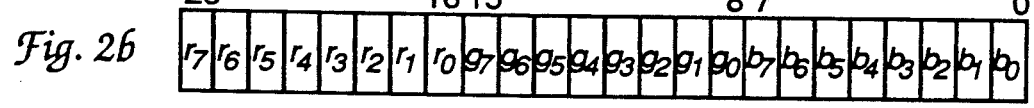

FIG. 2a shows the form of the full color pixel value and the positions of the component primary numbers. FIG. 2b shows all 24 bits of the full color pixel value.

One-Pass and Two-Pass Compression

The outermost operation of the compression algorithm is to examine each pixel to determine a descriptor which specifies the pixel. This scan of the entire image is termed a pass. At most 12 bits of information per pixel are processed per pass.

There are two modes of compression, termed full color and palette. A full color (i.e., 24—bit) compression requires two passes, where 12 bits of color are processed at each pass. The first Pass processes the lower 4 bits of each primary component taken as a 12-bit value $r_3r_2r_1r_0g_2g_1g_0b_3b_2b_1b_0$. Pass 2 processes the upper 4 bits of each primary component, or $r_7r_6r_5r_4g_7g_6g_5g_4b_7b_6b_5b_4$. The two passes are performed for two reasons. First, within a region of the image where shading or color changes smoothly, the upper bits changes less frequently than the lower bits. Therefore the compression is greater for the upper bits than it is for the lower bits. If all 24 bits were considered at once, then the compression would be no greater than that for the worst case of the upper bits or the lower bits. Secondly, a dynamic color lookup table holding 4096 colors is used to increase the compression, and this table requires 12 bits to specify an entry. (The color lookup table operation is described in a subsequent section.) The two-pass approach to full color compression is a unique feature of our algorithm.

A palette compression uses only one pass. In this case palette selection occurs prior to compression, and is not part of the compression algorithm proper. A 24-bit pixel value can assume one of $16,777,216 = 2^{24}$ possible colors. A palette is a small set of colors which approximates the full color range of an image. A palette can range from 32 colors minimum to 4096 colors maximum, where each individual palette color can have from 1 to eight bits per primary component (i.e., from 3 to 24 bits total). Palette selection begins by determining the approximating colors for the image; then each full color pixel value is replaced by a palette color which is closest to it.

Once an image has been converted to palette form, a pixel requires at most 12 bits to specify its color; hence one compression pass is sufficient to process a palette image.

Original and Difference Images

Compression of animated sequences of images can be improved by processing only those pixels of an image which have changed from the previous image. An important feature of the compression algorithm is the ability to detect such frame-to-frame coherence. An image which is to be compressed without reference to another image is called an original image or original frame; all pixels of an original image must be examined by each pass of the compression algorithm. An image which is to be processed with reference to another image is called a difference image; only those pixels which have different color values from the reference image are processed during compression.

The default compression of an animation treats the first image as an original image, and all subsequent images as difference images. This default can be overridden under software control so that any image can be considered an original image. It is not possible to consider the first image as a difference image.

Color Lookup Table

Figures 4A, 4B:
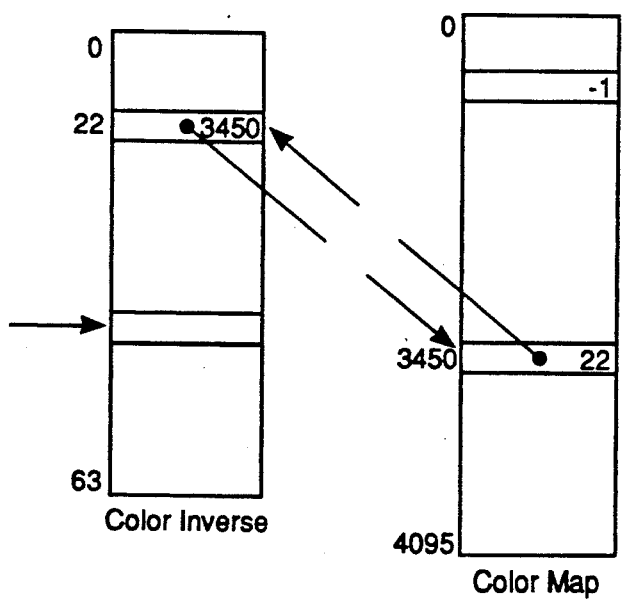
FIGS. 4a and 4b are diagrams showing color inverse and color map tables.

FIGS. 4a and 4b are diagrams of a color lookup table, comprising color inverse and color map tables.

Images typically have spatial locality of color. This means that a pixel of a given color is usually near another pixel of the same color. The compression of an image can be improved if colors can be specified in fewer than 12 bits. The compression algorithm exploits spatial locality of color by means of dynamic color lookup tables. There is a separate color lookup table for each pass of the compression algorithm. The table is initialized to default colors at the start of compression of an original image, and the table contents are preserved for compression of difference images.

Each color lookup table holds 64 colors. A pointer to the Place where a color can be inserted into the table moves circularly through the 64 entries; a new color is inserted at the entry pointed to by this pointer, and the pointer is advanced. When a color is encountered during compression it is checked against the lookup table. If the color is found in the table, then a descriptor with a 6-bit color field must be used. If the color is not found, then a 12-bit color field descriptor must be used, and the color must be inserted into the table. The descriptor type signals the decompressor whether to do a color lookup table reference or an insertion operation.

The use of dynamic color lookup tables is a unique feature of this compression algorithm.

Explanation of the Color Inverse and Color Map tables

Referring to FIGS. 4a and 4b the Color Inverse table contains the 64 most recently seen 12-bit color values generated during a pass. The table is treated as a circular queue, i.e., when the 64th entry (ordinal number 63) has been used, the next entry created will occupy the first position again, overwriting whatever was there previously. The 12-bit color values are used as an index to the Color Map table so that the Color Map entries can be reset to $-1$ whenever a Color Inverse entry must be reused. The Color Map table is used to quickly determine whether a 12-bit color value is currently contained in the Color Inverse table without having to actually search the Color Inverse table. This is an efficiency consideration that helps to speed up the code at the cost of a modest amount of storage.

Initial conditions

1. Each Color Inverse table entry contains its own index value, i.e., entry(0) contains 0, entry(1) contains 1, ... entry(63) contains 63.

2. The first 64 entries of the Color Map table (entry ordinals 0 ... 63) contain index values 0 ... 63. All other entries contain $-1$.

Use during a pass

When a new 12-bit color value is generated during a pass, the algorithm requires that it be represented in the Color Inverse table so that any subsequent references to the same 12-bit value can use a 6-bit field to describe it.

The following steps are used to determine whether the 12-bit value is already represented in the Color Inverse table, and, if not, how a new entry is added:

1. The 12-bit color value is used as an index into the Color Map table. (Note that 12 bits can contain a number between 0 and 4095). If the Color Map table value is $-1$, then a new entry must be made (step 2). Otherwise, the value contained in the Color Map table is a number between 0 and 63, which is the Color Inverse table index currently assigned for this 12-bit value.

2. If the Color Map table entry contains −1 for the current 12-bit value, then a new Color Inverse and Color Map entry must be made:

1. The next Color Inverse table entry to be used is at index "cinext" (initially 0). Using the current value at Color Inverse entry(cinext) at an index to the Color Map table, set the Color Map entry from the Color Inverse table.

2. At Color Inverse table entry(cinext), store the new 12-bit color value. Using the 12-bit value as an index to the Color Map table, set Color Map(12-bit value) to cinext.

3. Advance cinext, modulo 64, in preparation for the next entry to be added.

In the example shown in FIGS. 4a and 4b Color Inverse table entry 22 contains the 12-bit color value 3450, and Color Map table entry 3450 is pointing back to Color Inverse table entry 22. The arrow to the left of the Color Inverse table depicts the current "cinext" pointer; i.e., the position at which a new 12-bit color value will be added.

The decompression software reconstructs the color map and color inverse tables dynamically during the decompression process, based upon the descriptor types. Thus, the table contents for the compressor and the decompressor are exactly identical at every point in time during the decompression

Pixel Marking

Each pixel has a 1-bit state which is used to mark the pixel. A pixel which is marked is ignored by the compression algorithm. All pixels of an image begin in the unmarked state at the start of each compression pass. If a pixel of a difference image is the same 12-bit color as the pixel in the same location of the reference image, then it is marked prior to the compression pass; it is thus ignored during that pass of the compression. As each compression pass proceeds, a pixel which is not marked must be Processed to determine its descriptor. As each descriptor is determined, all pixels within the scope of the descriptor are marked to make them inaccessible from subsequent processing within the same pass. (The scope of a descriptor may include other Pixels in the neighborhood of the given pixel.)

Rectangle Detection

A very important feature of the compression algorithm is its ability to describe as single entities 2-dimensional areas of an image, in the form of rectangles with horizontal and vertical sides. When a given unmarked pixel is processed, its neighbors to the right and below are examined, and the largest rectangular array of unmarked pixels with the same 12-bit color as the given Pixel is determined. The given Pixel is the upper left corner pixel of this rectangle. A rectangle only one pixel wide horizontally is rejected if its height is greater than 1 pixel. If no neighboring unmarked pixels are found of the same color, then this step concludes with a rectangle of width and height equal to 1.

A descriptor which represents the rectangle (or single pixel, if the area of the detected rectangle equals 1) is generated and inserted into the compressed image descriptor list. All pixels covered by the rectangle are then marked. The use of rectangle descriptors is a unique feature of this compression algorithm.

Pixel Processing Order

Within a compression pass pixels are processed beginning with the upper left corner pixel, pixel (1,1), and proceeding to the right on the first scan line. After all pixels of a given line have been processed, the algorithm moves to the leftmost pixel of the next lower line.

Thus pixels are processed in order of increasing horizontal and vertical position, with the horizontal position coordinate varying most rapidly. As a given pixel is reached, its marking status is checked. If it is not marked, then the compression algorithm determines the appropriate descriptor to use to represent that pixel and neighboring pixels to the right and below it. If the pixel is marked, then the pixel search advances to the next pixel in the processing order An important feature of the compression algorithm is the implicit representation of pixel position as a side effect of the processing order. As each descriptor is generated to represent one or more pixels, the position of the next pixel to be examined is defined to be that pixel which follows in pixel processing order the rightmost pixel in the top line represented by the descriptor. For a descriptor representing a single pixel, the next pixel is the successor of that pixel in pixel processing order. For a descriptor representing a rectangle, the next pixel is the successor of the upper right corner pixel of the rectangle, in pixel processing order.

A significant feature in reducing the compressed image size is the exploitation of implicit change of position, with explicit change of position occurring only as required.

Explicit Change of Position

If it happens that the next pixel to be processed after generation of a descriptor is marked, then it is necessary to issue an explicit change of position descriptor to locate the next unmarked pixel position. If the next unmarked pixel fails to generate a rectangle with area greater than 1, and if the color of that pixel is the same as the color of the last descriptor issued, then a single bit of the explicit change of position descriptor is used to set the color as well as the new position; in this case pixel Position is also advanced in the usual processing order.

Compression Algorithm

An image is compressed by executing the compression algorithm once:

1. If the image is an original image, then
   a) Initialize the color map and color inverse tables such that
      each entry in the color inverse table contains its own ordinal value i.e. entry 0 contains 0, entry 1 contains 1, ... entry 63 contains 63; and the first 64 entries of the color map table contain their own ordinal value as in the color inverse table, with the remaining entries of the color map table containing the value −1;
   b) Initialize the color lookup table pointer to be 0.

If the image is a difference image, then do nothing at this step.

2. If this is a palette compression, then execute one pass where each 12-bit color is the full pixel value (of 12 or fewer bits).

If this is a full color compression, then
   a) Execute one pass where each 12-bit color is formed from the lower 4 bits of the three color primaries;

these 12 bits are identified as $r_3r_2r_1r_0g_3g_2g_1g_0b_3b_2b_1b_0$ using the notation of FIG. 2b b) Execute one pass where each 12-bit color is formed from the upper 4 bits of the three color primaries; these 12 bits are identified as $r_7r_6r_5r_4g_7g_6g_5g_4b_7b_6b_5b_4$ using the notation of FIG. 2b.

Pass Algorithm

A single pass is performed by executing the pass algorithm once and using a calling program:
1. Perform the following initialization:
   a) Current pixel position is (1,1)
   b) Previous pixel position is undefined
   c) Previous pixel color is undefined
   d) If this is a difference image, then mark each pixel which is unchanged from the previous image
2. Beginning at the current pixel position find the first pixel in processing order which is unmarked, then
   a) If there is such a pixel, then set the current pixel position to its position and the current pixel color to its color
   b) If there is no such pixel, then the pass is complete and terminates.
3. If the color of the current pixel is in the color lookup table associated with this pass, then use 6-bit color mode for the descriptor of the current pixel; otherwise insert the color into the table and use a 12-bit color mode for the descriptor of the current pixel.
4. Determine the largest rectangle comprised of pixels with color equal to the current pixel color which has the current pixel position for the upper left corner. Reject rectangles of horizontal width equal to 1 and height greater than 1.
Set the current rectangle to be this rectangle.
5. Mark each pixel in the current rectangle.
6. If the previous pixel position is undefined or not equal to the current pixel position then
   a) Issue one or more explicit change of position descriptors to move from the previous pixel position to the current pixel position.
   b) If the previous pixel color is defined, and if the current pixel color is equal to it, and if the current rectangle has area 1, then set the repeat previous pixel color bit in the change of position command and go to 1
7. If the current rectangle has area equal to 1, then issue a set color descriptor. If the current rectangle has area greater than 1, then issue a rectangle descriptor.
8 Perform the following update of state:
   a) Set the current pixel position to be the successor of the upper right corner pixel of the current rectangle
   b) Set the previous pixel position to be the same as the current pixel position
   c) Set the previous pixel color to be the same as the current pixel color
9. Go to 1

Descriptors

The descriptors used by the compression algorithm are shown in Table I; the definitions of the field names are shown in Table II. The descriptors have been designed such that the most frequently used descriptors require the fewest bits. Each individual descriptor entry for the compressed image is a multiple of eight bits in length to facilitate decompression on workstations or personal computers, and has the general format "tpppp" where "t" is a 2-bit type field and "pppp" are parameter bits for the specified type. The parameters are represented in Table I in the form "nbits/value" where "nbits" is the number of bits in the parameter field, and "value" is the field description. For example, "4/r" describes a 4-bit field holding a red color value.

More than four descriptors are defined. This is accommodated in the 2-bit type field as follows. Descriptor types 0, 1, and 2 try to capture the most frequently occurring operations for setting color, setting position, and defining a rectangle. Descriptor type 3 is used for control functions and for operations similar to descriptor types 0, 1, and 2, but which require more bits in order to represent larger numerical values.

Descriptor type 3 has two bits of "extended" descriptor type information. Thus there are 4 classes of operation which can be represented by descriptor type 3. Descriptor type 3 extended classes 0, 1, and 2 give expression to expanded versions of basic descriptor types 0, 2, and 2. These allow for more bits in the numeric fields, and therefore occupy more bytes in the compressed file. They are the less frequently used operations, however, so they do not adversely affect the overall compression efficiency. Within an extended class additional bits are used to extend the number of operations even further—however this level of extension only permits fine tuning of field widths, and the basic operations within an extended class are the same.

Compressed Image File Format

The compression algorithm generates an output file for storage on disk and for decompression playback of images and animations. This file is composed of a file header, which contains information about the file as a whole, and one frame structure for each image. The file is addressable in units of bytes, and the length of each component (i.e., the file header and the frame structure) is a multiple of eight bytes.

The file header is shown in FIG. 5. The Figure displays bytes eight per row, with the leftmost byte of each row occurring first in the file. The first eight bytes contain "Comprxxx", where "xxx" are three decimal digits of compression version number (the current version number is "014"). The next 120 bytes hold a 120 character ASCII title for the file, or 120 ASCII space characters if a title has not been specified; the title describes the contents or attributes of the images in the file, and is user selectable.

The next eight bytes hold the creation date of the file represented in day/month/year form as ASCII characters "dd/mm/yy". "dd" are the two digit characters for the day of the month, in the range 1 to 31. "mm" are the two digit characters for the month, in the range 1 to 12. "yy" are the two digit characters for the year, modulo 100.

The next eight bytes hold the creation time of the file represented in hour/minute/second form as ASCII characters "hh:mm:ss". "hh" are the two digit characters for the hour, in the range 0 to 23. "mm" are the two digit characters for the minute, in the range 0 to 59. "ss" are the two digit characters for the second, in the range 0 to 59.

The file "flags" byte is of the form (as eight binary bits) "ss000000". "ss" is a 2-bit structure specifier. 00 implies the file has no structure (that is, all frames are potentially unique). 01 implies that the file has a loop structure in which there are animation frames followed by a repetition of frame 1. 10 implies that the file has an autoreverse structure in which there are n animation frames followed by frames n-1. n-2, ..., 1.

The first frame number is simply a naming device which allows the user to identify the number of the first frame in any arbitrary numbering scheme. Typically the first frame is numbered 0 or 1, based on the application.

The number of frames specifies the total number of images represented in the file. These images are not necessarily unique, especially if the structure flag is not 00.

Following the file header are as many frame structures as specified by the number of frames value in the file header. The frame structure is shown in FIG. 6. Again the format for the Figure has eight bytes per row, such that the leftmost byte in each row occurs first in the file. Each frame structure begins with a short frame header.

The "flags" byte has the form (as eight binary bits) "op000000". "o" is a 1-bit original frame flag. If the image is an original image, then this bit is 1. If the image is a difference image, then this bit is 0. The first image of a file must have 1 for this bit. "p" is a 1-bit palette flag. If the image has been compressed in 1-pass, palette form then this bit is 1. If the image has been compressed in 2-pass, full color form then this bit is 0.

The number of words field holds the number of 8-byte words for the frame structure (header Plus data). The frame structure length is always a multiple of eight bytes; there may be 1 to 7 unused bytes in the final 8-byte word of a frame structure.

The compression algorithm can process any rectangular subregion of a full image as a separate entity, and the output of compression is one frame structure even in those cases where only a partial image (i.e., a rectangle smaller than the full image) is compressed. The upper left corner pixel position for the image rectangle is placed in "x" and "y"; if a full image is processed, then this value is (1,1). The width and height of the image rectangle are placed in "w" and "h"; if a full image has been compressed, then these values reflect the width and height of the complete raster image.

The "<Data>" words are the compressed image descriptors, as described above, and are summarized in Tables I and II. If the number of data bytes for the compressed representation of an image is not divisible by 8, then additional unused bytes are appended to the end of the data area to bring the length of the frame structure to a multiple of eight bytes.

Flow Chart of Compression Algorithm

Figure 7:
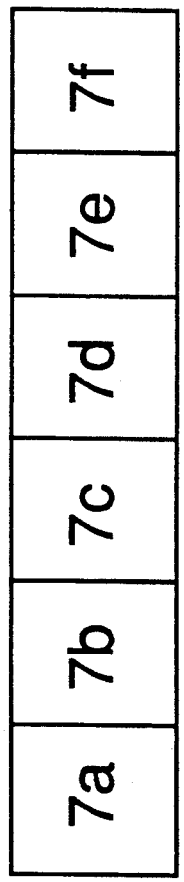
FIGS. 7a–7f, arranged as shown in FIG. 7, comprise a flow chart of a compression algorithm.
Figure 7A:
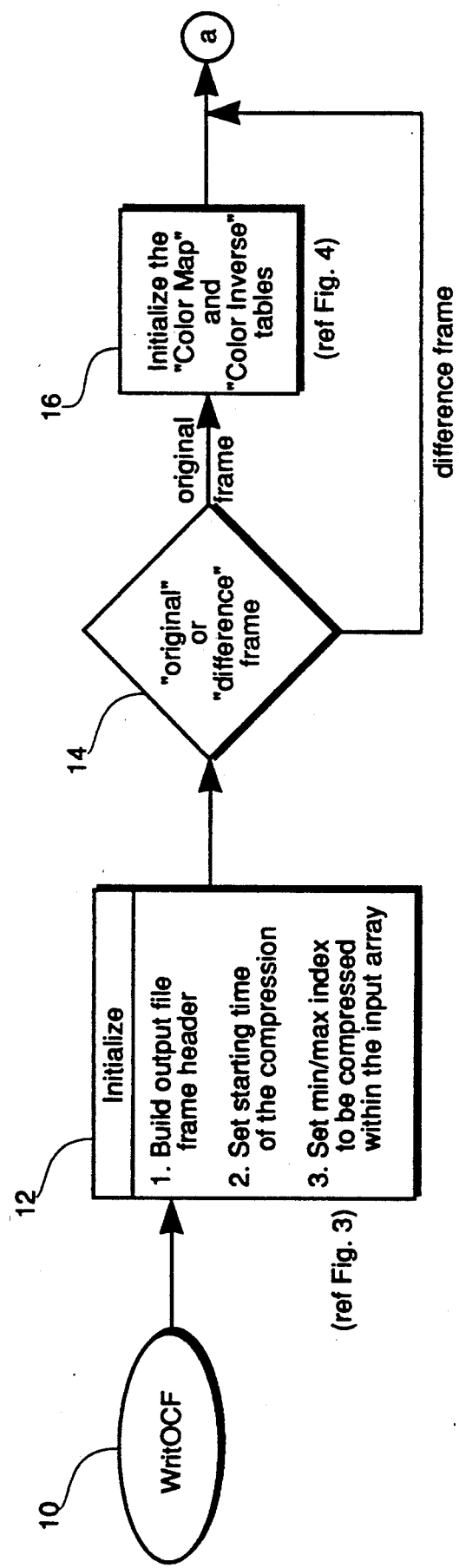

An image is compressed by executing the compression algorithm once. The flow chart comprises FIGS. 7a-7f, arranged as shown in FIG. 7.

Figure 3:
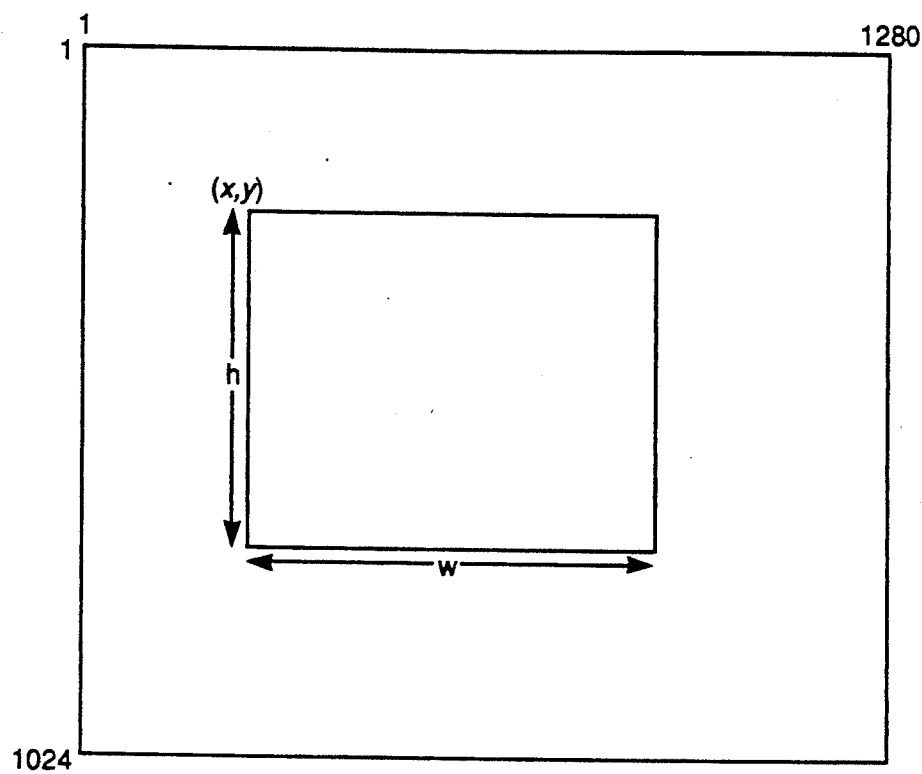
FIG. 3 is a diagram showing compression of an image subregion.

The operation starts at block 10, WritOCF (Write Output Compressed File). The Initialize block 12 shows 1) building an output file frame header, 2) setting the starting time of the compression, and 3) setting minimum and maximum values for an index to be compressed within the input array. FIG. 3 shows the compression of an image subregion at (x,y) of size w by h. The beginning point (x,y) and the height and width of the subimage to be compressed are passed as parameters to the subroutine. Remember that it is possible to compress full images or subimages. If (1,1) is passed as the (x,y) value, and w and h represent the width and height of the full image, then the entire image will be compressed.

At block 14, a decision is made at to whether this is an "original" or a "difference" frame.

If the image is an original image, the operation goes to block 16, to initialize the color lookup tables of FIG. 4 such that each entry in the color inverse table contains its own ordinal value i.e. entry 0 contains 0, entry 1 contains 1, ... entry 63 contains 63; and the first 64 entries of the color map table contain their own ordinal value as in the color inverse table, with the remaining entries of the color map table containing the value $-1$;

If the image is a difference image, then bypass block 16 and do nothing at this step.

Figure 7B:
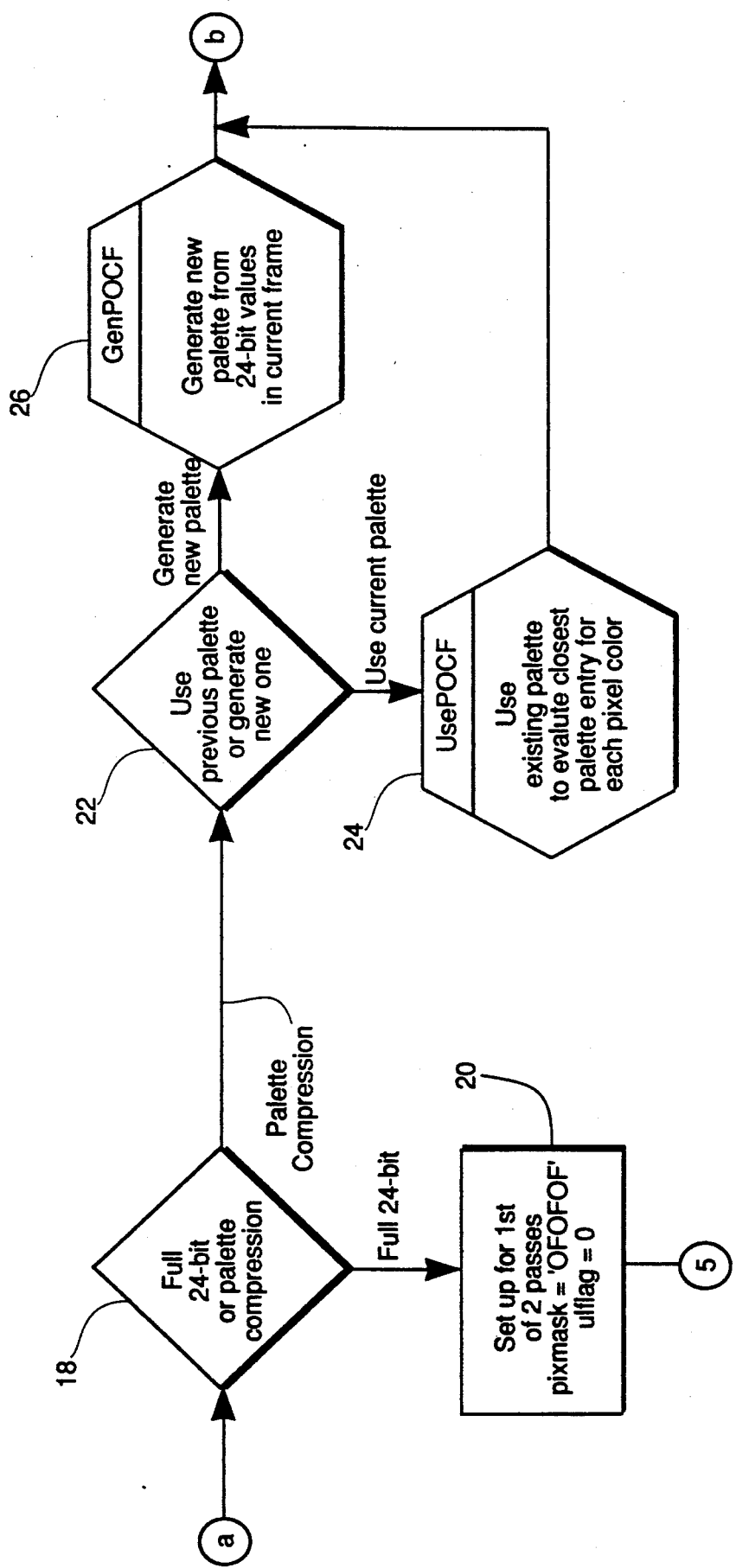

Next go to block 18 of FIG. 7b, to make a decision as to whether this is a full 24-bit or a palette compression. If this is a palette compression, then one pass of the Main "Pass" Loop will be executed, where each 12-bit color is the full pixel value (of 12 or fewer bits); whereas, if this is a full color compression, then the Main "Pass" Loop will be executed twice, in which there is one pass where each 12-bit color is formed from the lower four bits of the three color primaries, these twelve bits being identified as $r_3r_2r_1r_0g_3g_2g_1g_0b_3b_2b_1b_0$ using the notation of FIG. 2b, and a second one pass where each 12-bit color is formed from the upper four bits of the three color primaries, these twelve bits being identified as $r_7r_6r_5r_4g_7g_6g_5g_4b_7b_6b_5b_4$ using the notation of FIG. 2b.

From block 18, if this is a palette compression, the operation goes to block 22. (Note that palette compression is considered separate from the compression algorithm per se.) At block 22, a decision is made as to whether to use the previous palette of generate a new one. To use the current palette, go from block 22 to block 24, (Use Pallete for Output Compressed File) using the existing palette to evaluate the closest palette entry for each pixel color. To generate a new palette, go from block 22 to GenPOCF block 26 (Generate Palette for Output Compressed File) to generate the new palette from 24-bit values in the current frame.

Figure 7C:
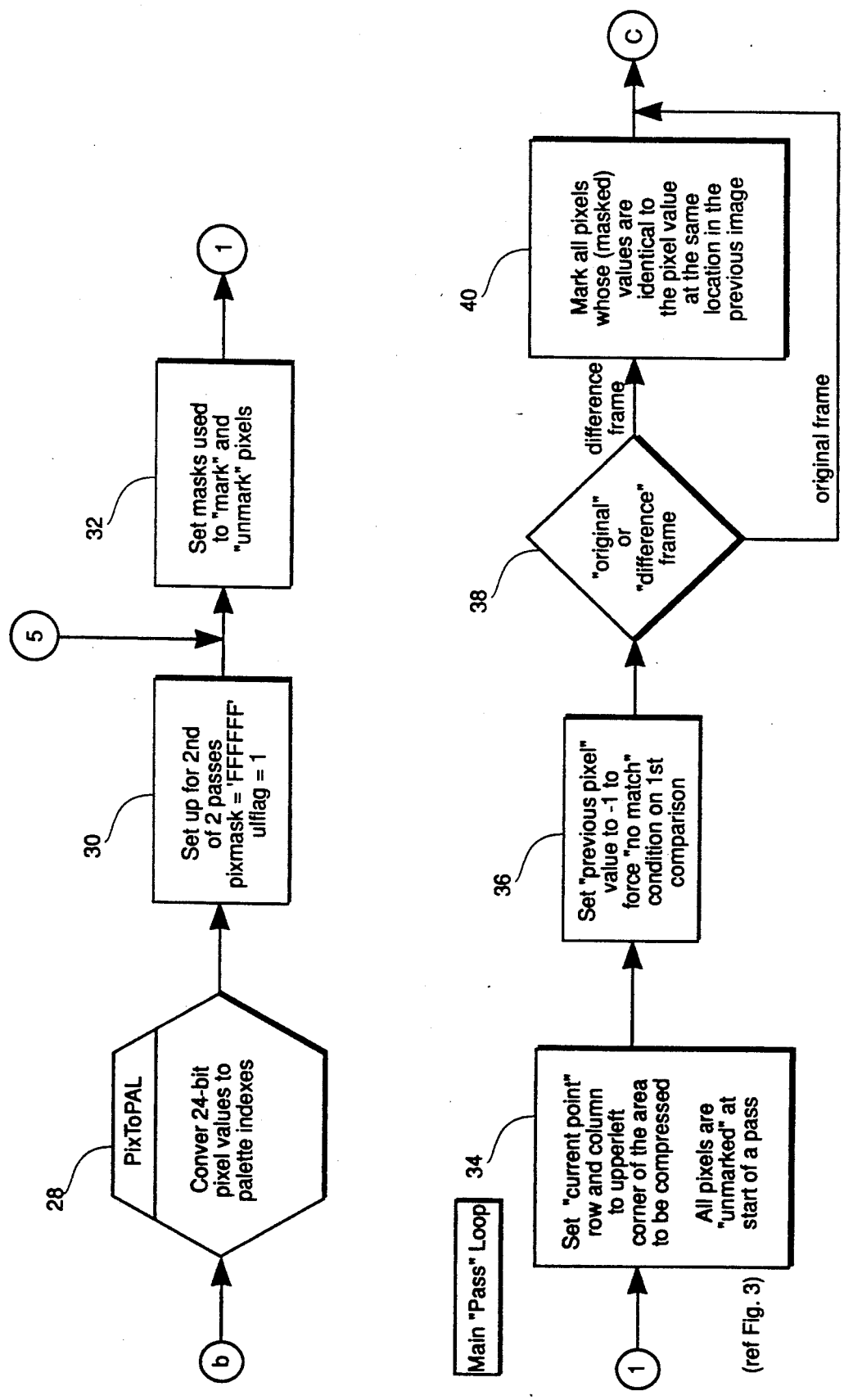
Figure 7E:
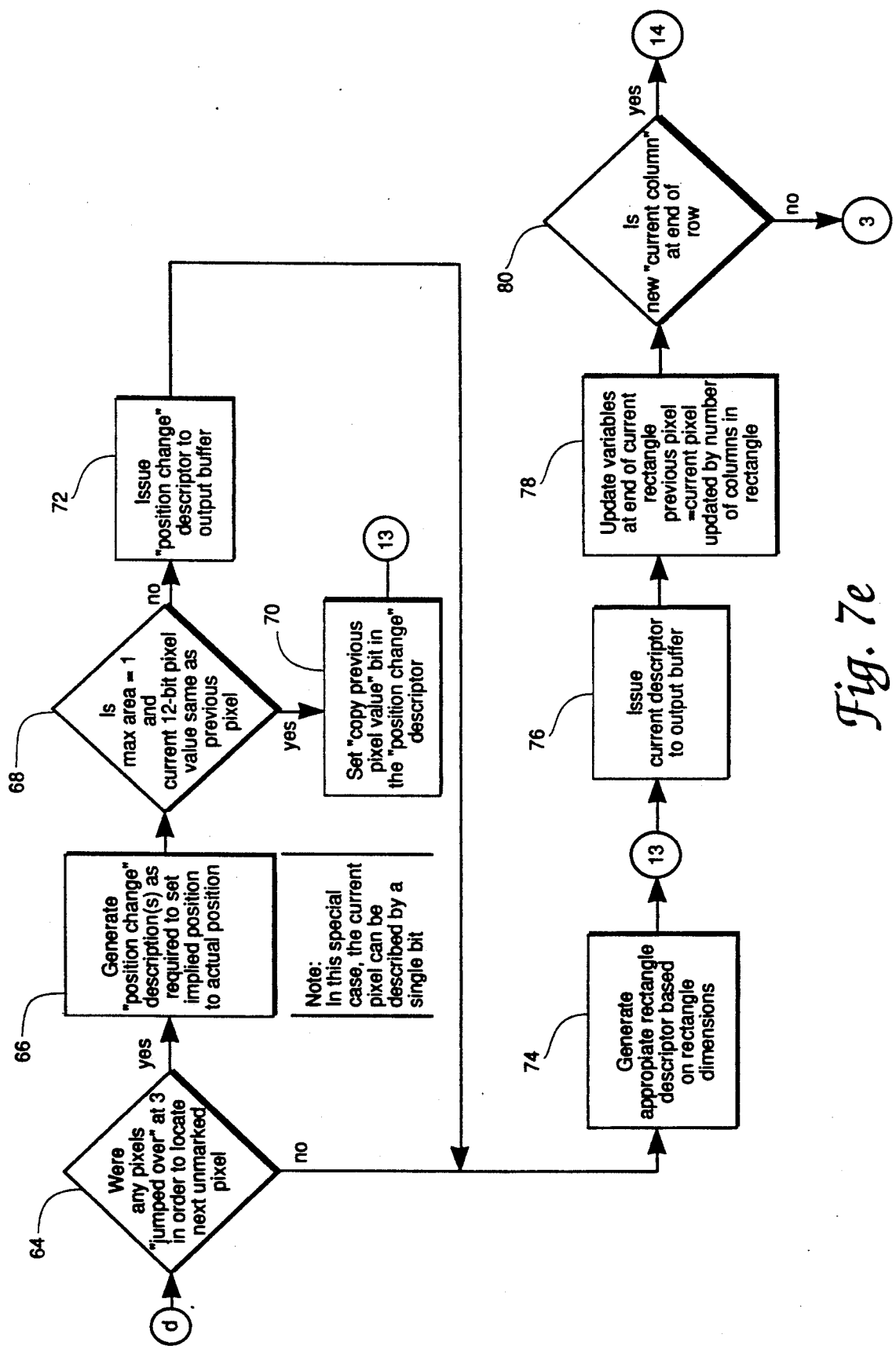
Figure 7F:
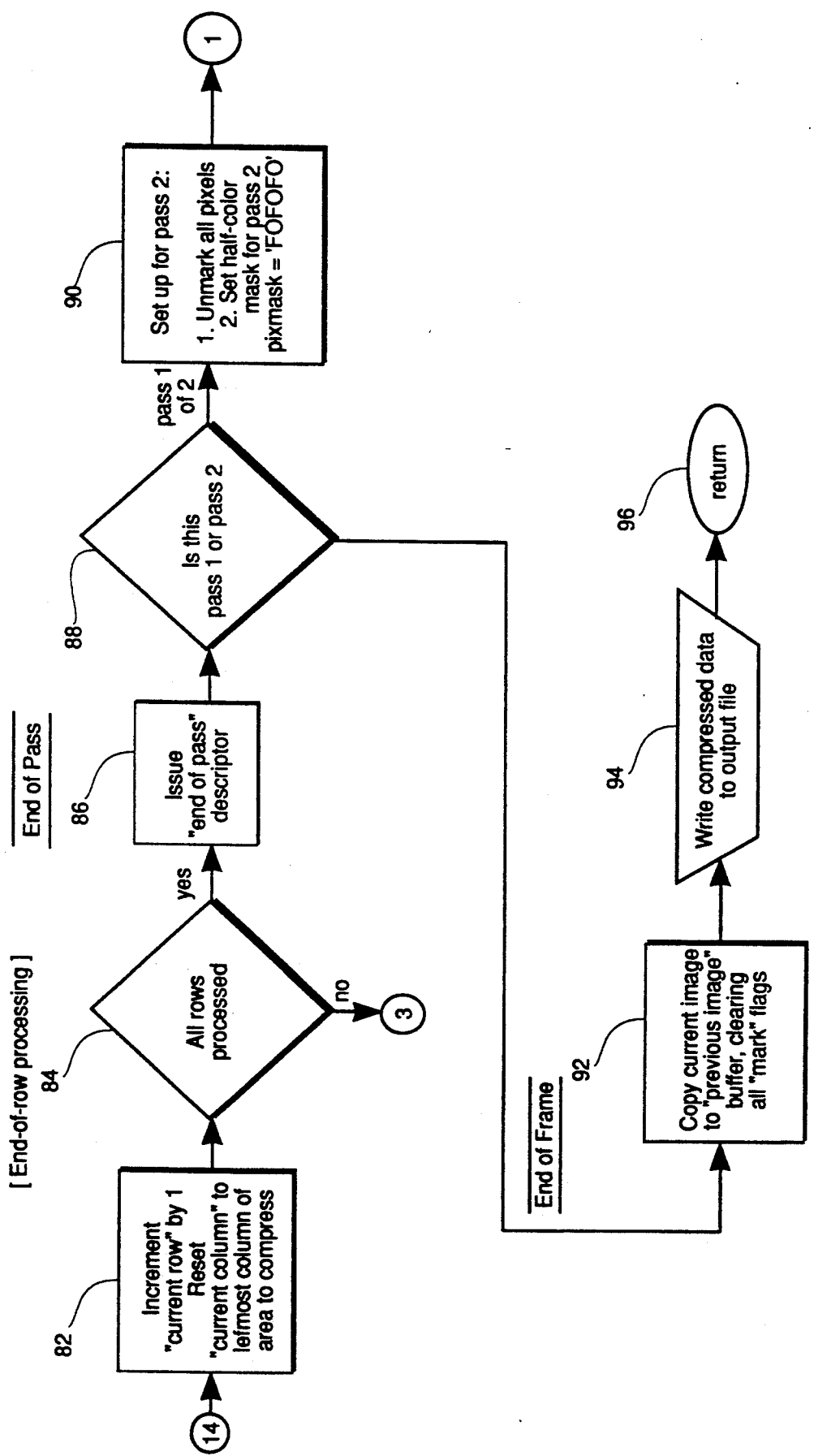

From block 24 or 26, the operation goes to FIG. 7c. At block 28 (PixToPal) the 24-bit pixel values are converted to palette indexes. Next, at block 30 the program is set up for the second of two passes, with a mask pixmask='FFFFFF' and a flag ulflag=1. The program then goes to block 32.

From FIG. 7b block 18, if this is a full 24-bit compression, the operation goes to block 20, where the program is set up for the first of two passes, with the mask pixmask='0F0F0F' and the flag ulflag=0. The program then goes via connector 5 to block 32.

A block 32, the program sets the masks used to "mark" and "unmark" pixels.

Pass Algorithm

The program now enters the main "Pass" Loop, via connector 1 to block 34. Each pass is performed by executing the pass algorithm once. Blocks 34–42 are used to perform initialization. At block 34, the "current point" row and column are set to the upperleft corner of the area to be compressed, as passed in the parameter list to subroutine WritOCF, i.e. the current pixel position is (x,y) as shown in FIG. 3. All pixels are "unmarked" at the start of a pass. The previous pixel position is undefined.

The previous pixel color is undefined, and at block 36 the "previous pixel" value is set to −1 to force a "no match" condition on the first comparison.

At block 38, a decision is made as to whether this is an "original" or a "difference" frame. If this is a difference image, then go to block 40 to mark each pixel which is unchanged from the previous image. If this is an original image, block 40 is bypassed. In either case, the operation next goes to block 42 in FIG. 7d, to set the "current row" and "current column" values to the upperleft corner of the area to be compressed. The initialization ends at connector 3.

The next step from connector 3, beginning at the current pixel position, is to find the first pixel in processing order which is unmarked.

If there is no such pixel, then the pass is complete and terminates. In this case the flow goes from block 44 to block 46, to determine if all pixels on the current row are marked. Being "yes", the operation goes via connector 14 to FIG. 7f, and at block 82 increments the "current row" by one and resets the "current column" to the leftmost column of the area to compress. At block 84 there is a check if all rows have been processed. The flow proceeds via connector 3 back to FIG. 7d, and thence via blocks 44, 46, 82 and 84 until all rows are processed.

Figure 2C:
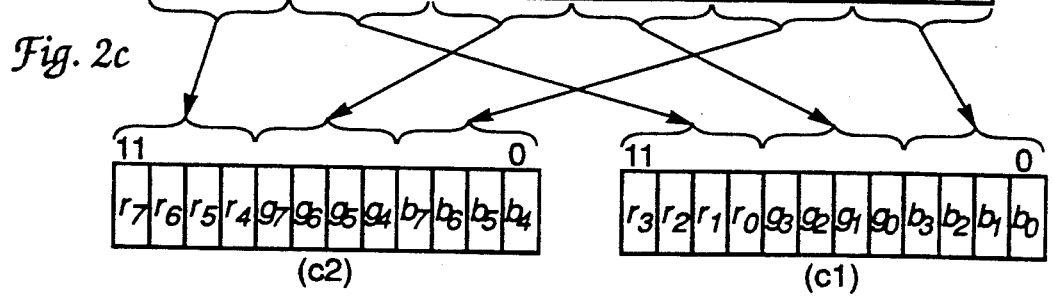

If there is an unmarked pixel, then at block 48 set the current pixel column position to its position. Blocks 52-58 are used to set the current pixel color to its color. At block 50, if this is a 24-bit case, the flow goes to block 52 to form the half-color (12-bit value) as shown in FIG. 2(c1) for pass 1, or FIG. 2(c2) for pass 2. If this is a palette compression, block 52 is bypassed. At block 54, set "cur06b" to the color-map index for "cur12b" based on the current pass, the value being set to −1 if the color is not in the color table. Cur06b is the variable used to point to the color inverse table, based upon the current 12-bit color value, and it is set from colormap-$_{cur12b}$ Cur12b is the variable containing the current 12-bit color value.

If the color of the current pixel is in the color lookup table associated with this pass, then use 6-bit color mode for the descriptor of the current pixel; otherwise insert the color into the table and use a 12-bit color mode for the descriptor of the current pixel. If at block 56 it is found that the 12-bit color is not in the color table yet, then at block 58 the value is put into the 64-entry color inverse table of FIG. 4, using the circular pointer. The oldest entry in the 64-entry table is replaced. (Since the decompressor works in lockstep with the compressor, entries which are removed during compression will have already been used as required during the decompression; at the point in time at which a new color inverse entry is made, the decompressor will begin to use the new entry.)

At block 60, determine the largest rectangle comprised of pixels with color equal to the current pixel color which has the current pixel position for the upper left corner. Reject rectangles of horizontal width equal to 1 and height greater than 1. Set the current rectangle to be this rectangle.

At block 62, mark each pixel in the current rectangle.

At block 64, a check is made as to whether any pixels were "jumped over" in the blocks following connector 3 of FIG. 7d. If not, the operation goes to block 74. If the previous pixel position is undefined or not equal to the current pixel position then, at block 66, issue one or more explicit change of position descriptors to move from the previous pixel position to the current pixel position. If the previous pixel color is defined, and if the current pixel color is equal to it, and if the current rectangle has area 1, as determined by a decision block 68, then go to block 70 to set the repeat previous pixel color bit in the change of position command and go to via connector 13 to block 76. (Note: in this special case, the current pixel can be described by a single bit.) Otherwise, if the decision at block 68 is "no", then go to block 72 to issue a "position change" descriptor to the output buffer.

At block 74, if the current rectangle has area equal to 1, then issue a set color descriptor. If the current rectangle has area greater than 1, then issue a rectangle descriptor. At block 76, issue a current descriptor to the output buffer.

At block 78, perform the following update of state:
a) Set the current pixel position to be the successor of the upper right corner pixel of the current rectangle
b) Set the previous pixel position to be the same as the current pixel position
c) Set the previous pixel color to be the same as the current pixel color At block 80, a test is made if the new "current column" is at the end of the row. If not, go via connector 3 to block 44 in FIG. 7d to process the next pixel on the current row. If it is the end of the row, go via connector 14 to block 82 in FIG. 7f to process the next row.

At block 82, increment the "current row" value by 1, and reset the "current column" value to the leftmost area to be compressed. At block 84 check if all rows have been processed, if not go via connector 3 to FIG. 7d to process the next row. After all rows have been processed, the flow goes from block 84 to begin End of Pass processing. At block 86 an "end of pass" descriptor is issued. At block 88 a flag is checked to see if this is the last pass for the frame. If it is pass 1 of 2, then go to block to set up for pass 2, by unmarking all pixels, setting a half-color mask for pass 2 as shown in FIG. 2 (c2), with a pixmask='F0F0F0', and go via connector 1 to FIG. 7c to make the second pass starting at block 34.

After the last pass for the frame (pass 2 or palette compression), the operation goes from block 88 for End of Frame Processing. At block 92 the current image is copied to a "previous image" buffer, and all "mark" flags are cleared. At block 94, write the compressed data for the frame to an output file. At block 96, return. The next frame will be processed starting at block 10 in FIG. 7a.

Alternatives

1. The compression algorithm can be run in two modes, full color (24-bits per pixel) and palette.

2. Palette compressions allow palette table size to vary from 32 entries to 4096 entries.

3. The palette entries can be generated using one to eight bits per primary color (Red, Green, Blue).

4. The palette can be determined once (using the colors of the first frame), or every n—th frame for n≧1.

5. Each frame beyond the first can be either an original frame or a difference frame.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

TABLE I

COMPRESSION ALGORITHM DESCRIPTORS

| Descriptor Type | Total Number of Bits | Descriptor Format | Comments |
|---|---|---|---|
| 0 | 8 | 2/0 6/clr_# | Set color |
| 1 | 8 | 2/1 1/flag 5/dcol | Set column on current row |
| 2 | 16 | 2/2 6/clr_# 4/#_rows 4/#_cols | Rectangle descriptor |
| 3/0 | 16 | 2/3 2/0 12/clr_# | Set color |
| 3/1/0 | 16 | 2/3 2/1 1/0 1/flag 10/dcol | Set column on current row |
| 3/1/1 | 24 | 2/3 2/1 1/1 1/flag 7/drow 11/column | Set column on different row |
| 3/2/0 | 24 | 2/3 2/2 2/0 12/clr_# 3/#_rows 3/#_cols | Rectangle descriptor |
| 3/2/1 | 24 | 2/3 2/2 2/1 6/clr_# 6/#_rows 6/#_cols | Rectangle descriptor |
| 3/2/2 | 32 | 2/3 2/2 2/2 12/clr_# 7/#_rows 7/#_cols | Rectangle descriptor |
| 3/2/3 | 32 | 2/3 2/2 2/3 6/clr_# 3/0 7/#_rows 3/0 7/#_cols | Rectangle descriptor |
| 3/3/0 | 16 | 2/3 2/3 2/0 2/0 4/nbpp 4/Ln2(p_siz) | Palette parameter setting |
| 3/3/1 | variable | 2/3 2/3 2/1 Ln2(p_siz)/p_ndx 3*nbpp/p_clr | Palette entry setting |
| 3/3/3/2 | 8 | 2/3 2/3 2/3 2/2 | End of pass 1 |
| 3/3/3/3 | 8 | 2/3 2/3 2/3 2/3 | End of pass 2 (end of frame) |

TABLE II

DEFINITION OF FIELD NAMES USED IN TABLE I

| Field Name | Meaning |
|---|---|
| 6/clr_# | 6-bit index into the color map table for the 64 most frequently occuring colors |
| 1/flag | Repeat previous pixel color flag<br>0 → the operation sets position only<br>1 → the operation sets position, and also pixel color |
| column | A column number, 1 ≤ column ≤ 1280 |
| dcol | A column change increment |
| drow | A row change increment |
| #_row | The height of a rectangle in number of rows - 1 |
| #_cols | The width of a rectangle in number of columns - 1 |
| nbpp | The number of bits per primary component in a palette color |
| Ln2(p_siz) | The logarithm, base 2, of the number of palette entries |
| p_ndx | A palette entry index, 0 ≤ p_ndx ≤ p_siz |
| p_clr | A palette color, expressed in 3 * nbpp bits |

What is claimed is:

1. A method of compressing data for a color image, comprising the steps:

executing a compression algorithm once:
 a1) if the image is an original image, then
  a) Initialize the color map and color inverse tables such that each entry in the color inverse table contains its own ordinal value i.e. entry 0 contains 0, entry 1 contains 1, ... entry 63 contains 63; and the first 64 entries of the color map table contain their own ordinal value as in the color inverse table, with the remaining entries of the color map table containing the value −1;
  b) initializing a color lookup table pointers to be 0,
 if the image is a difference image, then doing nothing at this step;
 a2) if this is a palette compression, then executing one pass where each 12-bit color is the full pixel value (of 12 or fewer bits);
 a3) if this is a full color compression, then
  a) executing one pass where each 12-bit from the lower 4 bits of the three color primaries; these 12 bits being identified as $r_3 r_2 r_1 r_0 g_3 g_2 g_1 g_0 b_3 b_2 b_1 b_0$, b) executing one pass here each 12-bit color is formed from the upper 4 bits of the three color primaries; these 12 bits being identified as $r_7 r_6 r_5 r_4 g_7 g_6 b_5 b_4$;

b) each said pass being performed by executing a pass algorithm once, comprising:
  b1) performing the following initialization:
   a) current pixel position is (x,y), as passed by a calling program, for a full image compression (x,y) being (1,1),
   b) previous pixel position is undefined,
   c) previous pixel color is undefined,
   d) if this is a difference image, then marking each pixel which is unchanged from the previous image,
  b2) beginning at the current pixel position finding the first pixel in processing order which is unmarked, then,
   a) if there is such a pixel, then setting the current pixel position to its position and the current pixel color to its color,
   b) if there is no such pixel, then the pass is complete and terminates;
  b3) if the color of the current pixel is in the color lookup table associated with this pass, then using 6-bit color mode for the descriptor of the current pixel; otherwise inserting the color into the table and using a 12-bit color mode for the descriptor of the current pixel;

b4) determining the largest rectangle comprised of pixels with color equal to the current pixel color which has the current pixel position for the upper left corner; rejecting rectangles of horizontal width equal to 1 and height greater than 1; setting the current rectangle to be this rectangle;

b5) marking each pixel in the current rectangle;

b6) if the previous pixel position is undefined or not equal to the current pixel position then, a) issuing one or more explicit change of position descriptors to move from the previous pixel position to the current pixel position;

b) if the previous pixel color is defined, and if the current pixel color is equal to it, and if the current rectangle has area 1, then setting the repeat previous pixel color bit in the change of position command and going to step b1;

b7) if the current rectangle has area equal to 1, then issuing a set color descriptor; if the current rectangle has greater than 1, then issuing a rectangle descriptor;

greater than 1, then issuing a rectangle descriptor;

b8) performing the following update of state:

a) Setting the current pixel position to be the successor of the upper right corner pixel of the current rectangle, b) Setting the previous pixel position to be the same as the current pixel position, c) Setting the previous pixel color to be the same as the current Pixel color;

b9) going to step b1.

2. In a method for effecting high speed transfer of graphics files, the improvement comprising compressing said files in accordance with claim 1, transmitting the compressed filed to a workstation, and decompressing said files at said workstation.

3. A method of compressing data for a color image, including a pass method used during compression of an image frame, said pass method comprising the steps:

1) performing the following initialization:

a) current pixel position is (x,y), as passed by a calling program, for a full image compression (x,y) being (1,1), b) previous pixel position is undefined, c) previous pixel color is undefined, d) if this is a difference image, then marking each pixel which is unchanged from the previous image, 2) beginning at the current pixel position finding the first pixel in processing order which is unmarked, then, a) if there is such a pixel, then setting the current pixel position to its position and the current pixel color to its color, b) if there is no such pixel, then the pass is complete and terminates;

3) determining the largest rectangle comprised of pixels with color equal to the current pixel color which has the current pixel position for the upper left corner; rejecting rectangles of horizontal width equal to 1 and height greater than 1; setting the current rectangle to be this rectangle;

4) marking each pixel in the current rectangle;

5) if the previous pixel position is undefined or not equal to the current pixel position then, a) issuing one or more explicit change of position descriptors to move from the previous pixel position to the current pixel position;

b) if the previous pixel color is defined, and if the current pixel color is equal to it, and if the current rectangle has area 1, then setting the repeat previous pixel color bit in the change of position command and going to step 1;

6) if the current rectangle has area equal to 1, then issuing a set color descriptor; if the current rectangle has area greater than 1, then issuing a rectangle descriptor;

7) performing the following update of state:

a) Setting the current pixel position to be the successor of the upper right corner pixel of the current rectangle, b) Setting the previous pixel position to be the same as the current pixel position, c) Setting the previous pixel color to be the same as the current pixel color;

8) going to step 1.

4. A method according to claim 3, which further includes a step following step 2), in which if the color of the current pixel is in a color lookup table associated with this pass, then using 6-bit color mode for a descriptor of the current pixel; otherwise inserting the color into the table and using a 12-bit color mode for the descriptor of the current pixel.

5. A method according to claim 4, for full color compression of a color image having 24-bit pixels with eight bits for each of three primary colors, the 24 bits being identified as $r_7r_6r_5r_4r_3r_2r_1r_0g_7g_6g_5g_4g_3g_2g_0b_7b_6b_5b_4b_3b_2b_1b_0$, executing a compression algorithm once, comprising the steps:

executing a first pass with said pass method where each 12-bit color is formed from the lower 4 bits of the three color primaries; these 12 bits being identified as $$r_3r_2r_1r_0g_3g_2g_1g_0b_3b_2b_1b_0,$$

executing a second pass with said pass method where each 12-bit color is formed from the upper 4 bits of the three color primaries; these 12 bits being identified as $r_7r_6r_5r_4g_7g_6g_5g_4b_7b_6b_5b_4$.

6. A method of compressing data for a color image, including a pass method used during compression of an image frame, wherein during a pass pixel colors are identified by n bits for $2^n$ colors, and a color inverse table is used having $2^m$ locations of n bits with addresses of m bits and having different n-bit values stored therein;

said pass method including the steps:

examining individual pixels of a frame using a n-bit color value;

determining if the color value is in the color inverse table;

if the color of the current pixel is in the color inverse table associated with this pass, then using the address as a m-bit color mode for a descriptor of the current pixel; otherwise inserting the n-bit color value into the color inverse table at an address indicated by a pointer and using the color value as a n-bit color mode for the descriptor of the current pixel, and advancing the pointer by one address, with the address following $2^m - 1$ being 0.

7. A method according to claim 6, which uses a color map table having $2^n$ locations of m bits each with the n-bit color values as addresses, with the addresses of the color inverse table stored at $2^m$ locations in the color map table corresponding to the color values stored in the color inverse table, with other locations of the color map table storing a given value which is not an address for the color inverse table;

wherein the step of determining if the color value is in the color inverse table comprises using the n-bit color value as an address to read from the color map table, with said given value being an indication that the color value is not in the color inverse table, and other values being an address of the color inverse table which is used as the m-bit descriptor.

* * * * *

UNITED STATES PATENT AND TRADEMARK OFFICE
CERTIFICATE OF CORRECTION

Page 1 of 2

PATENT NO. : 5,218,431
DATED : June 8, 1993
INVENTOR(S) : Michael K. Gleicher et al It is certified that error appears in the above-identified patent and that said Letters Patent is hereby corrected as shown below:

Abstract, line 4, a period should follow "size".
Column 2, line 54, "Permit" should not be capitalized.
Column 2, line 55, the comma should be a period.
Column 3, line 10, "Preventing" should not be capitalized.
Column 4, line 48, "Personal" should not be capitalized.
Column 5, line 10, "ne" should be ---new---.
Column 5, line 10, "t" should be ---to---.
Column 5, line 22, the quotation mark should be deleted.
Column 5, line 37, "large" should be ---larger---.
Column 5, line 52, "Personal" should not be capitalized.
Column 5, line 64, a period should follow "herein".
Column 6, lines 19-43, the paragraph should be deleted.
Column 6, line 57, ---x--- should precede "specifies".
Column 6, line 61, "W" should not be capitalized.
Column 7, line 14, "Pass" should not be capitalized.
Column 7, line 16, ---$g_3$--- should follow "$r_0$".
Column 8, line 17, "Place" should not be capitalized.
Column 9, line 29, a period should follow "decompression".
Column 9, line 41, "Processed" should not be capitalized.
Column 9, line 16, "Pixels" should not be capitalized.
Column 9, line 56, neither occurrence of "Pixel" should be capitalized.
Column 10, line 16, a period should follow "order".
Column 10, line 44, "Position" should not be capitalized.
Column 12, line 23, the first occurrence of "2" should be ---1---.
Column 13, line 17, "Figure" should not be capitalized.
Column 13, line 30, "Plus" should not be capitalized.
Column 15, line 39, a period should follow "curl2b".
Column 16, line 39, ---90--- should follow "block".
Table II, line 13, "row" should be ---rows---.

UNITED STATES PATENT AND TRADEMARK OFFICE
CERTIFICATE OF CORRECTION

PATENT NO. : 5,218,431
DATED : June 8, 1993
INVENTOR(S) : Michael K. Gleicher et al It is certified that error appears in the above-identified patent and that said Letters Patent is hereby corrected as shown below:

Column 18, line 32, ---color is formed--- should follow "12-bit".
Column 18, line 42, ---$g_5g_4b_7b_6$--- should follow "$g_6$".
Column 19, line 20, ---area--- should follow "has".
Column 19, line 22 should be deleted.
Column 19, line 30, "Pixel" should not be capitalized.
Column 9, line 35, "filed" should be ---files---.
Column 20, line 30, ---$g_1$--- should follow "$g_2$".

Signed and Sealed this

Seventeenth Day of May, 1994

Attest:

BRUCE LEHMAN

Attesting Officer          Commissioner of Patents and Trademarks